United States Patent
Carnevale

(10) Patent No.: US 9,712,896 B2
(45) Date of Patent: Jul. 18, 2017

(54) DEVICE AND METHOD FOR READING A METER

(71) Applicant: ACOTEL GROUP S.P.A., Rome (IT)

(72) Inventor: Claudio Carnevale, Rome (IT)

(73) Assignee: ACOTEL GROUPS S.P.A., Rome (RM) (IT)

( * ) Notice: Subject to any disclaimer, the term of this patent is extended or adjusted under 35 U.S.C. 154(b) by 6 days.

(21) Appl. No.: 14/982,722

(22) Filed: Dec. 29, 2015

(65) Prior Publication Data

US 2016/0198243 A1  Jul. 7, 2016

(30) Foreign Application Priority Data

Dec. 30, 2014 (IT) .............................. RM2014A0759

(51) Int. Cl.
H04Q 9/00 (2006.01)
G01D 4/00 (2006.01)
G06M 1/272 (2006.01)

(52) U.S. Cl.
CPC .............. *H04Q 9/00* (2013.01); *G01D 4/002* (2013.01); *G01D 4/008* (2013.01); *G06M 1/272* (2013.01); *H04Q 2209/60* (2013.01); *Y02B 90/247* (2013.01); *Y04S 20/50* (2013.01)

(58) Field of Classification Search
CPC ...... H04Q 9/00; H04Q 2209/60; G01D 4/002; G01D 4/008; G06M 1/272
See application file for complete search history.

(56) References Cited

U.S. PATENT DOCUMENTS

| | | | | |
|---|---|---|---|---|
| 4,031,386 A | * | 6/1977 | Recker | G01D 5/3473 250/230 |
| 4,685,138 A | * | 8/1987 | Antes | G06K 7/10881 235/468 |
| 5,010,334 A | * | 4/1991 | Ponzio | G06M 1/274 235/1 C |

FOREIGN PATENT DOCUMENTS

| DE | 202008007959 U1 | 11/2008 |
|---|---|---|
| EP | 0810548 A1 | 12/1997 |

OTHER PUBLICATIONS

Translation of DE 202008007959.*

* cited by examiner

*Primary Examiner* — Patrick Edouard
*Assistant Examiner* — Eboni Hughes
(74) *Attorney, Agent, or Firm* — Lucas & Mercanti, LLP

(57) ABSTRACT

A device and a method for reading a mechanical numerical totalizer meter having a plurality of decadic wheels is disclosed. The device includes a light source for illuminating a portion of a decadic wheel, a sensor for detecting a change in the intensity of light reflected by the illuminated portion of the decadic wheel and for linearly scanning the portion, a processing unit, connected to the light source and the sensor, for processing the change in light intensity detected by the sensor so as to determine the change from one numerical figure of the decadic wheel to the next numerical figure and to translate the change into at least a pulse signal; and a housing containing the light source. The sensor and processing unit, are suitable for constituting a darkroom and having an opening facing the meter.

15 Claims, 3 Drawing Sheets

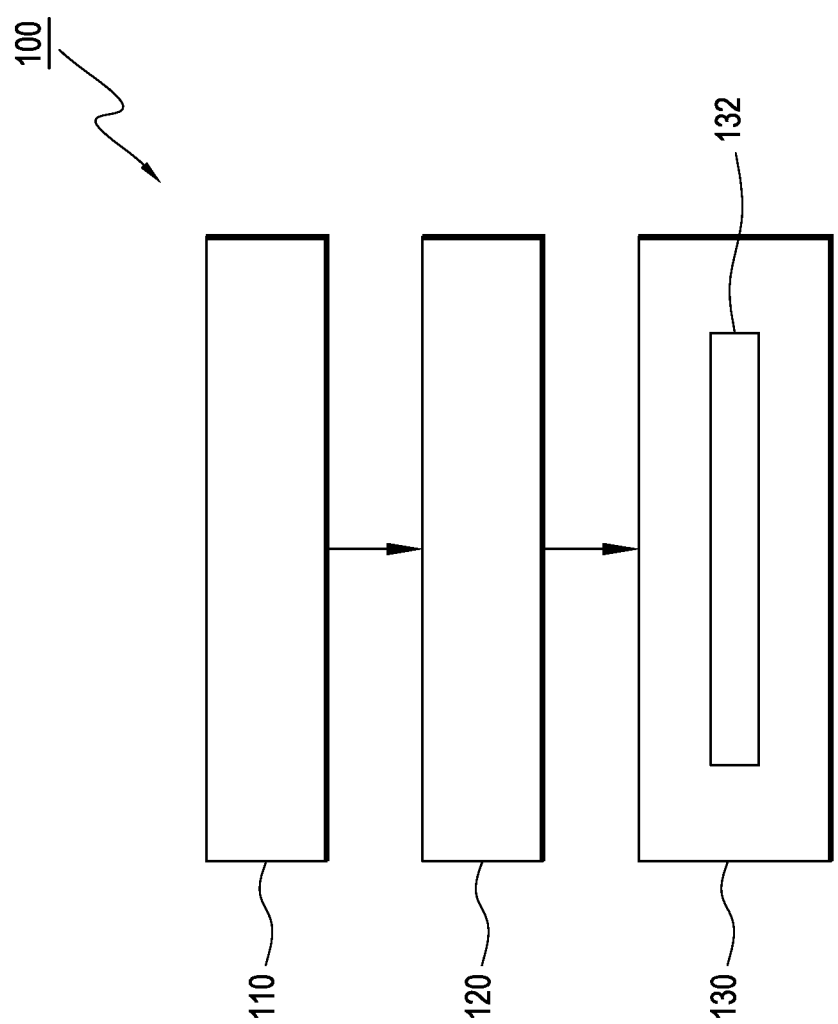

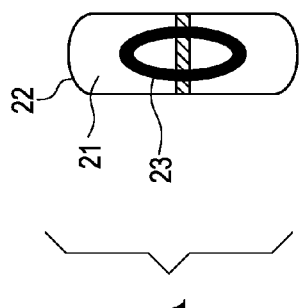
FIG. 3A
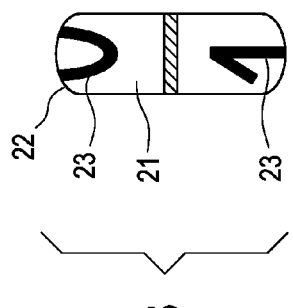
FIG. 3B
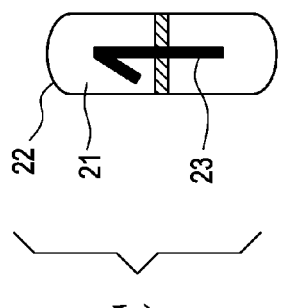
FIG. 3C
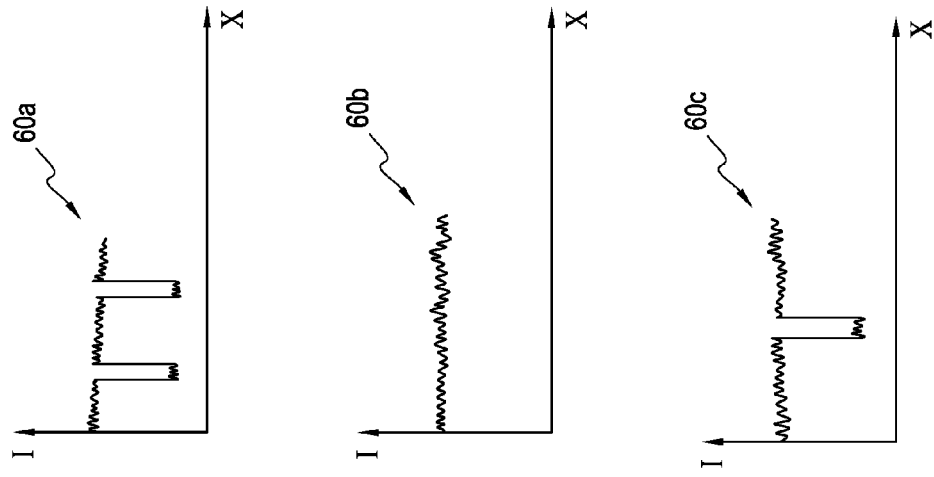
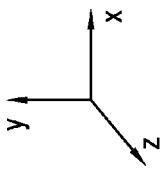

DEVICE AND METHOD FOR READING A METER

CROSS-REFERENCE TO RELATED APPLICATIONS

This application is claims the benefit of Italian Patent Application No. RM2014A000759, filed Dec. 30, 2014, the entire disclosure of which is incorporated herein by reference.

BACKGROUND OF THE INVENTION

The present invention refers to a device and method for reading a meter, particularly for reading a mechanical numerical totalizer meter provided with a plurality of decadic wheels for computing the progression of a physical quantity.

Domestic utilities, including gas, electricity and water, have always represented essential expenses in the management of a home or commercial business. Therefore, knowing the details as to consumption levels and having the possibility of monitoring them constantly is definitely essential for one's own self-interest and for saving some money on the final bill.

In the illustrative example of gas, the latter is metered by means of a meter that indicates the total volume of gas that has passed through a section of the pipe on which the meter is installed. These meters are universally employed on the premises of all combustible gas utility users, that is, residential, commercial, industrial users, etc.

There are different types of gas meters. As they are installed in homes, the meters most frequently used are diaphragm meters that are based on two measurement chambers (having a very precise volume) with deformable walls and that alternately fill up with gas and empty. Converted with a crank mechanism, this reciprocating movement, which is brought about by the difference in pressure between the inlet and outlet sections, is transmitted to a pinion that advances the decadic wheels of the mechanical totalizer located on the dial face. The sequence of numerical figures found on the decadic wheels will thus indicate the current gas consumption level.

As the meters are found in the respective homes or commercial businesses, the reading thereof must be carried out by a person (the actual user or personnel assigned to do this) who reads the sequence of figures on the decadic wheels on the dial face and then has to report it to the competent authority.

In recent years, also in response to requests by the competent authority for gas management, new types of meters (Smart Meters) have been installed, replacing the traditional mechanical totalizer with an electronic totalizer equipped with a device for data transmission. For the purposes of providing greater transparency concerning energy consumption, the Smart Meter or the household consumption digital meter detects and processes all important data, thus establishing a new criterion of efficiency in energy use and energy savings. Owing to this type of meter, a user can monitor consumption levels for their own home or commercial business and manage them more prudently. Moreover, by combining the meter with a data gateway, remote readings can be carried out. In this manner, the user and possibly the gas supplying agency can refer to current consumption data remotely at any time. The objective of the competent authority for gas is to reach the point of total replacement of the traditional mechanical totalizer meters with the more modern ones of the Smart Meter type. However, it will take several more years before the process of substituting the traditional meters can be completed.

For this reason, solutions are known that also enable remote reading for traditional meters that are provided with a mechanical totalizer.

For example, document DE 202008007959 U1 discloses a device for remote reading of a mechanical totalizer meter. This device utilizes optical sensors applied at the rotating disc or directly on the numerical display made up of the decadic wheels of the meter. In this latter case, the device has a camera and software for optical character recognition (OCR) so as to read the images on the numerical display and translate them into a data package that can be transferred in a wireless mode to a control center. However, although they can ensure satisfactory reading precision, systems of this type employ optical sensors such as CCD devices and optical recognition software that are very costly and bring about a considerable waste of energy.

Document EP0810548 A1 discloses a system for remote reading of a meter with a mechanical totalizer without using sophisticated software for recognition of the numerical figures. In this case, the meter is provided with a reference wheel associated with the movement of the decadic wheels of the totalizer. The reference wheel is covered with a highly absorbent material (black color) and partly with a highly reflective material (white color) and it is coupled to an infrared sensor and a LED light, the latter being an infrared LED light. Based on the different reflection of the light in different parts of the wheel, an associated electrical circuit will detect a different voltage for each rotation period. This information is then processed by a control system that can calculate the actual consumption of the meter. The reading system according to this document can also be implemented remotely. However, one disadvantage of this solution is that in order to operate, this system requires a reference wheel (or simply a marker), which is an element added to the traditional meter. Therefore, the system according to document EP0810548 A1 cannot be applied to any meter having a mechanical totalizer, since the latter must originally comprise a reference wheel or it must be modified by inserting suitable reference markers.

SUMMARY OF THE INVENTION

Therefore, the object of the present invention is to overcome the drawbacks mentioned above concerning known systems for reading meters and to provide a more economical and functional device and method.

The device according to the present invention is suitable for reading a mechanical numerical totalizer meter provided with a plurality of decadic wheels for computing the progression of a physical quantity. In particular, the device comprises a light source for illuminating a portion of at least one decadic wheel, a sensor for detecting a change in the intensity of the light reflected by the illuminated portion of the decadic wheel and for linearly scanning said portion, and a processing unit connected to the light source and to the sensor, for processing the change in the intensity of light detected by the sensor, so as to determine the change from one numerical figure of the decadic wheel to the next numerical figure and to translate said change into at least a pulse signal. Lastly, the device comprises a housing containing said light source, said sensor and said processing unit, the housing being suitable for constituting a darkroom and having at least one opening facing the meter.

This device is economically realized and efficient in its operation.

According to the present invention, an automatic reading of a meter having a mechanical totalizer can be carried out and converted into a pulse signal, which can be easily utilized for transferring data in a wireless mode.

With respect to the systems known in the literature, the device according to the present invention does not require the use of costly sensors or sophisticated optical character recognition software, which, among other things, has the further disadvantage of having to manage an extremely large amount of data. In the case of a reading with digital optical sensors (CCD cameras) and character recognition using OCR software, it should be considered, for example, that for real-time viewing, high-level performance is required by the optical sensor and that the video realized is not always easily to manage in terms of data transport. Even relinquishing real-time readings, and acquiring images at regular intervals for example, it should be considered in any case that the memory required must be large enough for good computing speed in viewing systems of this type. Furthermore, it should be kept in mind that in many cases the view of the digital sensor can be disturbed by various factors such as varying lighting or the presence of condensation, thus requiring continuous calibration of the sensor.

The present device overcomes the above-mentioned disadvantages and in addition, it can be applied to any traditional meter having a mechanical totalizer, without the latter having to be specially modified by applying markers for optical recognition.

In fact, the device according to the present invention basically functions as a fixed reader/scanner that detects the movement of the decadic wheel and thus the succession of the numerical figures thereon. Unlike the systems known in the literature, the sensor utilized in the device according to the present invention does not detect the reflected intensity of light referring to specific optical markers, but referring rather to the numerical figures already present on the decadic wheels. For this reason, the device is positioned with respect to one of the decadic wheels of the totalizer, which comprise the numbers of progression from 0 to 9. Specifically, the device performs a linear scan centered on one of the numerical figures by means of the light source, which illuminates the corresponding portion of the wheel, and of the sensor, which detects and measures the intensity of light reflected by the surface of the wheel. In this manner, a waveform is generated that will be modulated based on the fact that the intensity of light reflected on a "colored" area (portion of the numerical figure) or a white area (absence of the portion of the numerical figure) is measured. By comparing the various waveforms detected at certain time intervals, the device is capable of evaluating rotation of the decadic wheel based on the number of white areas and "colored" areas detected. A totally white area corresponds to the interval area between two consecutive numerical figures. It should be noted that the concept of a "colored" area and a white area is purely conventional and that this device can operate in the same manner for meters in which the decadic wheels show numerical figures in black on a white background, as well as numerical figures in white on a black background or with any other color combination.

For the purpose of optimizing detection of the intensity of reflected light and thus of screening possible external radiation, the housing, which comprises at least the sensor and the light source, constitutes a darkroom and has at least one opening at the meter, particularly at the portion of the decadic wheel that undergoes scanning. The shape of the opening can be such as to enable emission of light by the light source and detection of the reflected light by the linear sensor. Alternatively, for the purpose of optimizing the surface of the opening in the housing and therefore reducing it, realizing a housing comprising two openings of limited dimensions, one at the light source and another at the linear sensor, is conceivable.

In a preferred configuration of the invention, the housing is shaped in the form of an elongate capsule. However, it can be of any other shape that is suited to the aim of the present invention.

According to a preferred embodiment of the present invention, the light source comprises at least one LED, that is, a light-emitting diode. Based on the various possible colors of the numerical figures and background of the decadic wheels, the light contrast can be optimized by intervening on the spectrum emitted by the LED source. For this reason, employing LEDs of various types with an emission spectrum suited to the purpose is conceivable. For example, using a red-emitting LED or an infrared emitter such as an infrared LED is conceivable. To improve the quality and distribution of the illumination of the portion of the decadic wheel, the use of a plurality of light sources arranged according to a precise geometrical configuration, for example in a linear form, is conceivable.

According to another preferred embodiment of the present invention, the sensor consists of a linear sensor. In this case as well, based on the light source and the color of the numerical figures and background of the decadic wheels, the use of different types of sensors, for example a sensor that acts in the infrared or red spectrum, is possible. In this manner, it is possible to detect the intensity of the light source reflected on the illuminated portion of the decadic wheel.

To improve the focusing of the light on the linear sensor, positioning an optical system such as a lens or a set of lenses between the sensor and the portion of the decadic wheel being scanned is conceivable. In the case of a configuration with two openings on the housing, the focusing lens can be secured onto the opening at the linear sensor. In a further embodiment of the present invention, the device comprises an infrared LED output for generating light pulse signals. In this manner, by means of the processing unit, the device is capable of converting the meter reading, in terms of the change in the intensity of light reflected, into a light pulse signal. In other words, the change from one numerical figure to the next can be translated for example with a pulse of light. Clearly, it is also conceivable that the single pulse can be associated with the succession of a plurality of figures, for example with a complete rotation of the decadic wheel. The possibility of converting the optical reading of the meter into pulses of light offers the advantage of making it possible to connect a light pulse scanner to the device, said scanner being able to offer a digital electronic reading of consumption in real time and that can be easily transferred to a control center using wireless communication systems. The infrared LED output can be advantageously arranged on the rear part of the housing on the surface opposite the opening facing the meter.

As an alternative or in addition to the embodiment described above, the device can comprise an OC (open collector) output for generating light pulse signals. In a manner identical to the preceding case, the device is capable of converting the optical reading of the meter into electrical pulses, offering the advantage of making it possible to connect an electrical pulse scanner to the device, said scanner being able to offer a digital electronic reading of consumption in real time and that can be easily transferred to a control center using wireless communication systems.

For the purpose of preventing errors during the meter reading, the housing comprises a positioning means for centering the sensor with respect to a numerical figure of at least one of the decadic wheels. In this manner, the device totally covers the portion of the decadic wheel that needs to be read and processing of the reading can take place clearly and without problems relating to interpretation. This positioning means enables perfectly centered linear scanning of a portion of a decadic wheel, for example the portion relative to third or second decimal figures. As described hereinabove, the sensor detects a horizontal segment constituted by a darker part (where the numerical figure is present) and by a lighter part (where the figure is absent). The positioning means can consist of a receiving element, such as a cavity for example, secured to the surface of the meter, and an insertion element, such as a pin for example, present on the housing of the device, so that by inserting the pin in the cavity, the housing, and as a result the sensor, proves to be perfectly aligned with the portion of the decadic wheel being scanned. Naturally, different positioning means comprising elements such as rulers, levels, magnets, etc. are conceivable.

For the purpose of reducing the margin of error in the meter reading, centering the sensor with respect to more than one numerical figure at the same time is conceivable; for example, centering the sensor with respect to two contiguous decadic wheels, the one bearing the first decimal figures and the one bearing the second decimal figures, is conceivable. In this manner, in the case in which ten second decimal figures have changed, i.e. after a complete rotation of the decadic wheel bearing the second decimal figures, but the sensor has not detected a change in the wheel bearing the first decimal figures, the device is capable of identifying a malfunction or irregularity of the meter.

In one embodiment of the present invention, the housing comprises a fastening means for securing the device to a surface of the meter. This fastening means can consist of two elements, one that can be secured to the meter and the other that can be secured to the device, both being connectable to each other. In particular, it is conceivable that the fastening means can be configured as a clip system arranged between one of the surfaces of the housing and the upper (or lower) part of the dial face of the meter, so that the housing, and as a result the sensor and the light source, can cover the dial face and therefore the decadic wheels stably during the optical reading. Advantageously, in the case in which one wishes to view the totalizer in a traditional manner, that is, without any device being interposed, the device can be detached at any time from the surface of the meter (always by means of the clip system). Removal of the housing from the dial face can be carried out by actually releasing the housing from the surface of the meter or by lifting (or lowering) the housing, which thus remains hinged along one of its surfaces by means of a hinge system. In a practical manner, the fastening means can be secured to the surface of the meter using adhesive means.

Advantageously, the fastening means can be combined with the positioning means in such a manner that once the housing has been secured to a surface of the meter, the device is automatically centered and aligned with the portion of the decadic wheel that needs to be scanned.

In an advantageous embodiment of the present invention, the device comprises means for connection with a pulse signal reader that can read light pulse signals or electrical pulse signals. The reader is connected to an apparatus that is remotely monitored and controlled by means of a computer service platform by using a cellular network as the communication channel. This connection system can consist of a cable that connects the device to a pulse reader. Alternatively, the connection means can consist of a wireless communication module, for example a Wi-Fi or ZigBee communication module.

By means of the connection with a reader remotely monitored and controlled by a Cloud platform, data serving for the reading can be transmitted with a minimum expenditure in terms of energy and costs and the consumption levels measured can be viewed remotely with greater awareness on the part of the end users. Moreover, this makes it possible to eliminate invoicing based on estimates with the relative need for balancing adjustments, regarding periodic measurements and switching measurements. Lastly, this ensures an overall improvement in the quality of the measurement, sales and distribution services of the energy carrier.

It should be noted that the device according to the present invention preferentially applies to the reading of gas meters, in which the physical quantity computed by the decadic wheels is the total volume of a gas. However, this device also finds application with other meters such as electricity meters or water meters for example. In other words, the device at hand can be applied to any type of meter provided that it has a mechanical totalizer with a plurality of decadic wheels.

According to a preferred embodiment, the device is powered independently by batteries inside or external to the housing. However, as an alternative, it is conceivable that the power supply for the device can come from the apparatus connected thereto for reading the pulse signals.

The method for reading a mechanical numerical totalizer meter provided with a plurality of decadic wheels for computing the progression of a physical quantity according to the present invention is characterized by the following actions: illuminating a portion of at least one decadic wheel by means of a light source, detecting a change in the intensity of light reflected by the illuminated portion of decadic wheel, and linearly scanning said portion by means of a sensor and processing the change in the light intensity detected by the sensor so as to determine the change from one numerical figure of the decadic wheel to the next numerical figure and translate said change into at least a pulse signal, in which the light source, the sensor and the processing unit are contained within a housing suitable for constituting a darkroom and having at least one opening facing the meter. As explained in greater detail hereinabove regarding the device, in a similar manner, by means of the method according to the present invention, it is possible to convert an optical reading of a mechanical totalizer meter into a pulse signal in a functional and economical manner, given that it can be applied to any type of mechanical meter without the latter having to be modified by applying optical markers and without employing costly sensors (CCD) and software for optical character recognition (OCR).

According to an embodiment of the present invention, the method comprises the action of generating a waveform modulated by the change in the intensity of light reflected on the illuminated portion of the decadic wheel. In fact, the sensor detects a horizontal segment constituted by a darker part (where the numerical figure is present) and by a lighter part (where the figure is absent). Detection of the intensity of light reflected on the dark or light part is translated into a waveform having maximum values at the point of maximum reflection (light areas) and minimum values at the point of minimum reflection, or maximum absorption (dark areas). Based on an analysis of the waveforms, the change from one numerical figure to the next on the decadic wheel can be evaluated. In fact, when the pinion coupled to the mechanical totalizer is triggered, that is, when the wheel advances by one numerical figure, the proportions between the light and dark areas change. This is detected by the sensor that determines a change in the intensity of light reflected within the segment scanned and thus determines the movement of the wheel.

It should be kept in mind that prior to activating the detection function for detection on the part of the sensor of the intensity of light reflected, the initial numerical data displayed on the totalizer needs to be recorded so as to obtain a real indication calculated on the basis of the increments detected. For example, these data can be supplied to a control center that will analyze and monitor the consumption levels of the meter being examined.

In an advantageous embodiment of the present invention, the method comprises the action of processing the change in the intensity of the light reflected in various sections of the illuminated portion of the decadic wheel so as to determine the exact value of the numerical figure of the decadic wheel. In other words, a more detailed analysis of the individual horizontal segments scanned is conceivable, so as to evaluate the proportions between the dark area and light area and thus determine the numerical figure illuminated by the light source. In this manner, the device is not limited to evaluating the change from one numerical figure to the next, but it is capable of recognizing the value of the numerical figure on the decadic wheel. The device can thus be provided with a display screen for viewing the numerical figures scanned in a digital electronic manner or it can directly send the values of the numerical figures to a control center that will analyze them and determine the current consumption levels of the meter. Recognition of the numerical figures can be carried out on-site in the device by the processing unit or it can be entrusted to a control center that will receive the raw data and provide for the translation and analysis thereof. In an embodiment of this type, taking into account the initial numerical value read on the indicator to be used as the initial reference point from which to calculate all the changes detected with the device will no longer be necessary.

In this manner, optical recognition of the numerical figures of the totalizer would be obtained without using costly OCR software and without having to transfer a large amount of data and images.

In a preferred embodiment of the present invention, scanning of the horizontal segment takes place in 3 ms, at periodic intervals, for example at intervals of 10 seconds.

Advantageously, the method according to the present invention can implement a connection with a pulse signal reader connected to an apparatus remotely monitored and controlled by means of a computer service network by using a cellular network as the communication channel, for example a GSM communication channel. In this manner, the meter can be controlled and monitored directly and individually through the cellular network, making use of the Cloud platform. A user can thus access the platform directly using an Internet connection via HTTP/GPRS and monitor the status of the meter, checking the functions thereof and reading the consumption levels in real time. At the same time, the user can directly receive warnings or reports from the apparatus connected to the reader, said warnings or reports being sent through USSD or SMS messages.

BRIEF DESCRIPTION OF THE DRAWINGS

These and other aspects of the present invention will become more apparent in light of the following description of some preferred embodiments described herein below. The present invention shall therefore be described solely by way of example, referring to a specific example embodiment, which is non-limiting or not binding, and illustrated in the attached figures, of which:

FIG. 2 is a flow diagram representing a method for reading a mechanical totalizer meter according to the present invention; and FIG. 3A is a schematic representation of a linear scan of a first portion of a decadic wheel and the corresponding waveform;

FIG. 3B is a schematic representation of a linear scan of a second portion of a decadic wheel and the corresponding waveform; and FIG. 3C is a schematic representation of a linear scan of a third portion of a decadic wheel and the corresponding waveform.

DETAILED DESCRIPTION

Figure 1B:
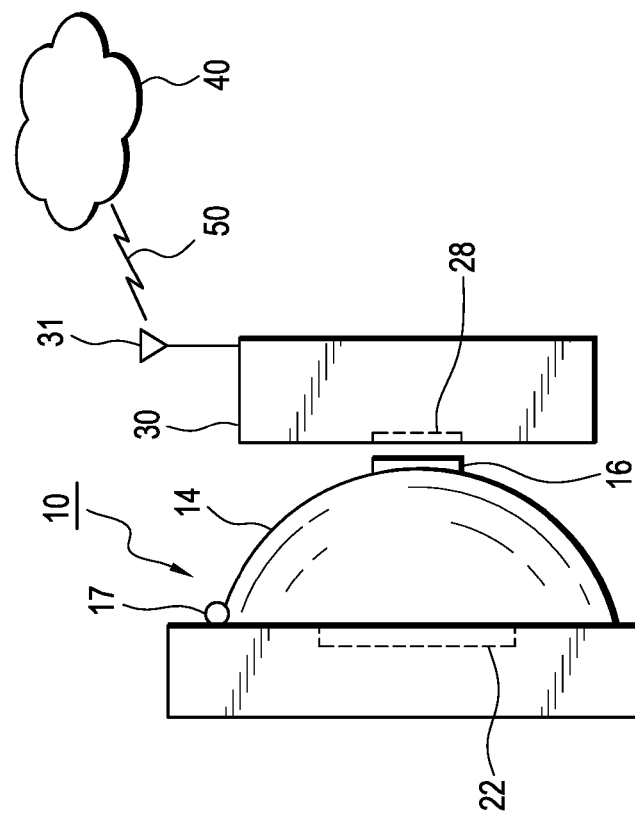
FIGS. 1A and 1B are schematic representations of a device for reading a mechanical totalizer meter according to the present invention, as seen from the front (A) and from the side (B)
Figure 1A:
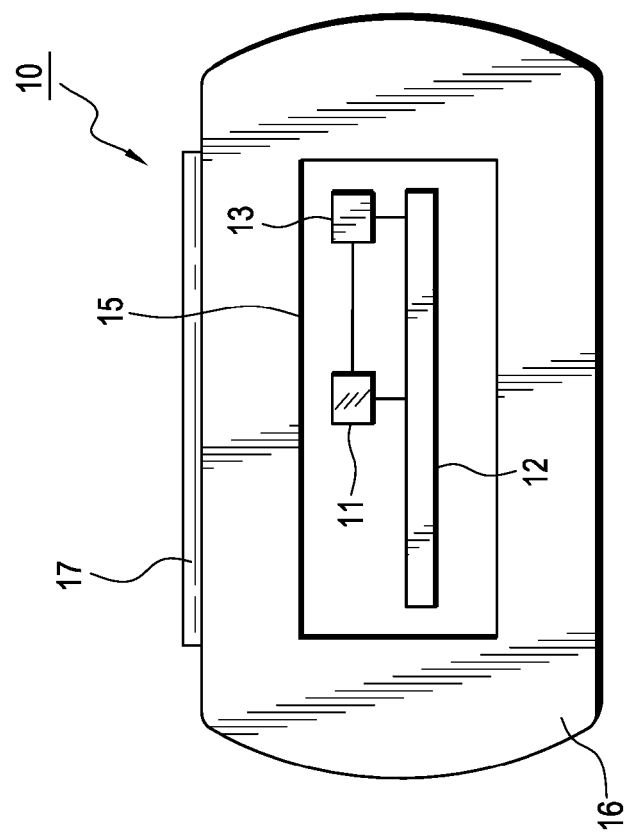

FIG. 1 shows the device 10 for reading a mechanical numerical totalizer meter 20, specifically a gas meter, provided with a plurality of decadic wheels 22. The device 10 comprises a light-emitting diode (LED) 11 emitting light in the red spectrum and a linear infrared sensor 12. The device further comprises a processing unit 13 connected to the LED 11 and to the sensor 12. The LED 11, the sensor 12 and the processing unit 13 are housed inside a capsule-shaped container or housing 14 having only one opening 15, said opening 15 facing the meter 20. As can be observed in FIG. 1A, which shows the device 10 in a frontal view, the opening 15 extends symmetrically to the center of one of the walls of the housing 14, and the LED 11 and sensor 12 are both arranged in the center of this opening 15. The housing 14 represents a darkroom for the elements present therein so as to prevent any interference with possible external radiation. In fact, as shown in FIG. 1B, once the device 10 has been positioned on the surface of the meter 20 and the opening 15 is centered with respect to the decadic wheels 22 so as to carry out the optical reading, the housing 14 forms a totally closed container. An infrared LED output 16 for generating light pulse signals is present on the rear part of the housing 14. This enables connection with a pulse signal reader 28 connected to an apparatus 30 that is remotely monitored and controlled by means of a Cloud computer service platform 40 using a GSM cellular network 50 as the communication channel. In this manner, readings of the meter 20 can be remotely monitored and the measured data stored by means of the Cloud platform 40. For this purpose, the apparatus 30 is provided with a GSM antenna 31 for communication with the platform 40.

A fastening means 17 that can be secured to the surface of the meter 20 is present on the upper part of the housing 14. This means is made up of a clip and a hinge that enable the device 10 to be tilted upwards so as to ensure direct observation of the dial face of the meter 20, should this be necessary. The clip system also enables possible release of the device 10 from the surface of the meter 20.

FIG. 2 shows the various steps of the method 100 for reading a mechanical numerical totalizer meter 20, specifically a gas meter, provided with a plurality of decadic wheels 22.

As a first step 110, a portion of at least one decadic wheel 22 is illuminated by the LED 11. Then in step 120, the sensor 12 detects the intensity of the light reflected by the wheel and linearly scans said portion. Lastly, in step 130 the change in light intensity detected by the sensor is processed so as to determine the change from one numerical figure of the decadic wheel to the next numerical figure and translate said change into at least a pulse signal. Included in the data processing step 130, the method 100 comprises the step 132 of generating a waveform 60 modulated by the different intensity of light reflected on the illuminated portion of the decadic wheel 22.

In conclusion, FIGS. 3A, 3B and 3C show an example of linear scanning for three different portions (a, b, c) of a decadic wheel 22 and the respective waveforms 60a, 60b, 60c. The decadic wheel 22 in FIGS. 3A, 3B and 3C has a white background 21 on which the numerical FIG. 23 are represented in black. For the sake of clarity, FIGS. 3A, 3B and 3C do not show the device 10 applied at the decadic wheel 22, but only the portion a, b or c of the wheel 22 on which linear scanning is performed. More specifically, FIGS. 3A, 3B and 3C illustrate the case in which the device is found at a numerical FIG. 23 (cases a and c) and the case in which the device is found halfway between two numerical FIG. 23 (case b).

In case a, the linear scan is centered on the "0" figure. Here the sensor will detect at least two dark areas at the two margins of the oval representing the number "0". The corresponding waveform 60a thus shows two areas along the extension of the portion scanned in which the intensity of reflected light is minimal.

In case b, the linear scan is centred in the transition area between the number "0" and the number "1". Here, the sensor does not detect any dark areas and therefore the corresponding waveform 60b shows a nearly unchanged intensity of reflected light.

Lastly, in case c, the linear scan is centered on the number "1". Here the sensor will detect at least one dark area at the vertical bar representing the number "1". The corresponding waveform 60c thus shows one area along the extension of the portion scanned in which the intensity of reflected light is minimal. By comparing the various waveforms, the processing unit 13 will thus be capable of evaluating the change from one waveform with a virtually constant intensity 60b to a waveform of varying intensity 60a and 60c, thereby determining the change from one numerical figure to another and it will be capable of translating this information into a pulse signal, for example a light signal. As mentioned above, a more detailed analysis of the waveforms in terms of absorbed intensity values, number of maximum or minimum peaks and their relative distances, could also ensure determination of the exact value of the numerical figure being scanned.

A person skilled in the art can introduce numerous further modifications and variations to the device and method described hereinabove for the purpose of meeting additional and contingent needs, all of which, however, remaining within the scope of protection of the present invention as defined by the claims attached hereto.

The invention claimed is:

1. A device for reading a mechanical numerical totalizer counter provided with a plurality of decadic wheels for computing the progression of a physical quantity, the device comprising:
   a) a light source to illuminate a portion of a least one decadic wheel;
   b) a sensor to detect the change in the intensity of the light reflected by the portion of decadic wheel illuminated and to linearly scan said portion;
   c) a processing unit, connected to the light source and the sensor, to process the change in the light intensity detected by the sensor so as to determine the change from one figure of the decadic wheel to the figure subsequent thereto and to translate said change into at least a pulse signal, wherein the reflected intensity of light is detected referring to the figures already present on the decadic wheel without using any specific optical markers and wherein the sensor detects the reflected intensity of light relative to a horizontal segment on the portion of the decadic wheel constituted by a part where the figure is present and another part where the figure is absent, the detection of light on the two different parts being translated into a waveform having maximum values at the point of maximum reflection and minimum values at the point of minimum reflection; and
   d) a housing containing said light source,
   said sensor and said processing unit suitable for constituting a darkroom and having at least an opening facing the counter.

2. The device according to claim 1, wherein the light source comprises a red LED.

3. The device according to claim 1, wherein the sensor is constituted of an infrared linear sensor.

4. The device according to claim 1, further comprising a lens placed between the sensor and the portion of illuminated decadic wheel.

5. The device according to claim 1, further comprising an infrared LED output for generating light pulse signals.

6. The device according to claim 1, further comprising an OC output for generating electric pulse signals.

7. The device according to claim 1, wherein the housing comprises a positioning means for centering sensor with respect to a figure of at least one of the decadic wheels.

8. The device according to claim 1, wherein the housing includes a fastening means which may be secured to a surface of the counter.

9. The device according to claim 1, further comprising a means for connection with a pulse signal reader connected to an apparatus remotely monitored and controlled by means of computer service network by using a cellular network as communication channel.

10. The device according to claim 1, that wherein the physical quantity is the total volume of a gas.

11. A method for reading a mechanical numerical totalizer counter provided with a plurality of decadic wheels for computing the progression of a physical quantity, the method comprising:
   a) illuminating a portion of a least one decadic wheel by means of a light source;
   b) detecting a change in the intensity of the light reflected by the portion of decadic wheel illuminated and linearly scanning said portion by means of a sensor, wherein the reflected intensity of light is detected referring to the figures already present on the decadic wheel without using any specific optical markers; and
   c) processing the change in the light intensity detected by the sensor so as to determine the change from one figure of the decadic wheel to the figure subsequent thereto and translating said change into at least a pulse signal, wherein the reflected intensity of light is detected relative to a horizontal segment on the portion of the decadic wheel constituted by a part where the figure is present and another part where the figure is absent, the detection of light on the two different parts being translated into a waveform having maximum values at the point of maximum reflection and minimum values at the point of minimum reflection, wherein said light source, said sensor and said processing unit being contained in a housing suitable for constituting a darkroom and having an opening facing the counter.

12. The method according to claim 11, wherein it generates a waveform modulated by the change in the intensity of the light reflected by the illuminated portion of the decadic wheel.

13. The method according to claim 12, wherein it processes the change in the intensity of the light reflected in the various sections of the portion of the illuminated decadic wheel so as to determine the exact value for the figure of the decadic wheel.

14. The method according to claim 11, wherein the linear scanning has a duration of approximately 3 ms.

15. The method according to claim 11, wherein it implements a connection with a pulse signal reader connected to an apparatus remotely monitored and controlled by means of computer service network by using a cellular network as communication channel.

* * * * *